(12) United States Patent
Hirai

(10) Patent No.: US 6,701,436 B1
(45) Date of Patent: Mar. 2, 2004

(54) INFORMATION REPRODUCING AND RECORDING APPARATUS AND METHOD WHICH PERMITS COPYING FOR PERSONAL USE WHILE PROTECTING A COPYRIGHT

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/318,006

(22) Filed: May 25, 1999

(30) Foreign Application Priority Data

May 28, 1998 (JP) .......................................... 10-147174

(51) Int. Cl.[7] ............................................... H04L 9/00
(52) U.S. Cl. ......................................... 713/176; 705/57
(58) Field of Search ................................ 713/176, 200; 380/201, 252; 705/57, 58; 369/84, 47.1, 47.12; 711/4, 163, 164

(56) References Cited

U.S. PATENT DOCUMENTS

| | | | | |
|---|---|---|---|---|
| 5,694,381 A | * | 12/1997 | Sako ........................ | 369/47.12 |
| 6,243,796 B1 | * | 6/2001 | Otsuka ........................ | 711/163 |
| 6,477,649 B2 | * | 11/2002 | Kambayashi et al. ........ | 713/200 |
| 6,526,510 B1 | * | 2/2003 | Kori et al. ................... | 713/176 |

* cited by examiner

Primary Examiner—Frantz B. Jean
Assistant Examiner—Hosuk Song
(74) Attorney, Agent, or Firm—Frommer Lawrence & Haug LLP; William S. Frommer; Dennis M. Smid

(57) ABSTRACT

The following operations are performed according to instructions from a CPU. The ID information of music information having a copyright that is recorded on a reproduction-side recording medium is detected by a first inherent information detection circuit. The ID information indicating the kind of a recording-side recording medium is detected by a second inherent information detection circuit. Based on information retrieved from a history memory, a judgment circuit judges whether the music information has already been copied to and recorded onto a recording medium of the same kind as the recording-side recording medium. If a judgment result is affirmative, the CPU prohibits the operation of copying and recording the music information recorded on the reproduction-side recording medium onto the recording-side recording medium. If the judgment is negative, the operation of copying and recording the music information recorded on the reproduction-side recording medium onto the recording-side recording medium is performed with the CPU's judgment that this operation is intended for personal use of the music information having a copyright. A digital watermark generated by a digital watermark encoder and a collation code are recorded separately on the recording-side recording medium, whereby analog recording is also prohibited. Alteration of the data of the recording-side recording medium can be detected by comparing a collation code obtained from the digital watermark and the collation code recorded separately from the digital watermark. The music information having a copyright can thus be protected accurately.

12 Claims, 5 Drawing Sheets

INFORMATION REPRODUCING AND RECORDING APPARATUS AND METHOD WHICH PERMITS COPYING FOR PERSONAL USE WHILE PROTECTING A COPYRIGHT

BACKGROUND OF THE INVENTION

1. Field of the Invention

The present invention relates to an information reproducing and recording apparatus and method for reproducing and recording information. In particular, the invention relates to an information reproducing and recording apparatus and method for copying music, video, or like software having a copyright so as to enable protection of the copyright.

2. Description of the Related Art

In recent years, distribution media of music, video, and like software have become diverse and complex. On the other hand, digital information such as music, video information, and computer programs does not deteriorate even if it is repeatedly copied to and recorded onto recording media. Therefore, it is an important issue how to protect software having a copyright.

For example, as shown in FIG. 1(A), if information having a copyright that is recorded on a CD (compact disc) 17 is reproduced therefrom by a reproducing drive 16 and recorded on a recordable MD (mini disc; trademark of Sony Corp.) 20a by a recording drive 20a, the information having a copyright that is recorded on the CD 17 is copied to and recorded onto the MD 18. Therefore, as shown in FIG. 1(B), it is possible to reproduce the information thus recorded on the MD 20a by mounting it in the reproducing drive 16 and copying and recording it onto a new MD 20b that is mounted in the recording drive 18.

By repeating the above process, the information having a copyright that is recorded on the CD 17 can be copied to and recorded onto many recording media MD 20a, 20b, . . . Protecting the copyright is an issue to be addressed.

As for the copyright issue, in the SCMS (serial copy management system), a method is employed in which when information having a copyright is copied and recorded via a digital interface, copying and recording of the information is permitted only once as long as it is judged to be intended for personal use.

By employing the SCMS, as shown in FIG. 2(A), information having a copyright that is recorded on a CD 17 can be reproduced therefrom by a reproducing drive 16 and copied to and recorded onto a DAT (digital audio tape) 21a, for example, by a recording drive 18. However, as shown in FIG. 2(B), it is prohibited to reproduce, by the reproducing drive 16, the information thus recorded on the DAT 21a and copy and record it onto an MD 20a by the recording drive 18.

Similarly, by employing the SCMS, as shown in FIG. 3(A), information having a copyright that is recorded on a CD 17 can be reproduced therefrom by a reproducing drive 16 and copied to and recorded onto a HDD (hard disk dive) 22a, for example, by a recording drive 18. However, as shown in FIG. 3(B), it is prohibited to reproduce, by the reproducing drive 16, the information thus recorded on the HDD 22a and copy and record it onto an MD 20a by the recording drive 18.

As described above, by employing the SCMS, the use of a recording medium to which information having a copyright has been copied and recorded from an original recording medium is limited to personal use and a further copying and recording operation on another recording medium is prohibited. The purpose of copyright protection is thus attained.

However, the SCMS has inconvenience that a user cannot record information having a copyright from an original recording medium to a HDD, perform necessary editing, record edited information onto an MD which is convenient for portable use, and use it personally.

The SCMS has another problem that although it can limit copying and recording via a digital interface, information that is copied to and recorded on a recording medium can further be analog-recorded, in which case resulting copied information is somewhat deteriorated though.

On the other hand, in recent years, MD changers have come to be used. If an MD changer 23 is mounted in a recording drive 18 and information having a copyright that is recorded on a CD 17 is reproduced therefrom by a reproducing drive 16 and recorded onto an MD changer 23, recording is automatically performed onto MDs of such a number as the MD changer 23 can accommodate. This may cause a problem in the copyright protection.

In general, a copying and recording operation from a CD to an MD, for example, in home is intended to record information onto a recording medium that is superior in portability and use that information personally. Similarly, a user's operation of editing information recorded on a HDD and then copying and recording edited information onto an MD, for example, is intended for personal use of information that has been edited so as to match the user's taste. Each case does not infringe the copyright.

On the other hand, an act of infringing a copyright is to perform a copying and recording operation on many recording media of the same kind at one time.

SUMMARY OF THE INVENTION

An object of the present invention is to provide an information reproducing and recording apparatus which resolves the above-described problems.

Another object of the invention is to provide an information reproducing and recording method which resolves the above-described problems.

The invention provides an information reproducing and recording apparatus including first inherent information detecting means, second inherent information detecting means, history information storing means, judging means, and copying control means. The first inherent information detecting means reads out first ID information relating to an author that is recorded on a reproduction-side recording medium. The second inherent information detecting means reads out second ID information relating to a recording-side recording medium that is recorded on the recording-side recording medium. The history information storing means stores the first ID information and the second ID information so as to correlate those with each other. The judging means judges whether to permit or prohibit an operation of copying and recording information having a copyright that is reproduced from the reproduction-side recording medium onto the recording-side recording medium based on the first ID information detected by the first inherent information detecting means and the second ID information detected by the second inherent information detecting means while referring to the history information storing means. The copying control means permits or prohibits execution of the copying and recording operation in accordance with a judgment result of the judging means.

The invention also provides an information reproducing and recording method including a first inherent information detecting step, a second inherent information detecting step, a history information storing step, a judging step, and a copying control step. The first inherent information detecting step reads out first ID information relating to an author that is recorded on a reproduction-side recording medium. The second inherent information detecting step reads out second ID information relating to a recording-side recording medium that is recorded on the recording-side recording medium. The history information storing step stores the first ID information and the second ID information so as to correlate those with each other. The judging step judges whether to permit or prohibit an operation of copying and recording information having a copyright that is reproduced from the reproduction-side recording medium onto the recording-side recording medium based on the first ID information detected in the first inherent information detecting step and the second ID information detected in the second inherent information detecting step while referring to information stored in the history information storing step. The copying control step permits or prohibits execution of the copying and recording operation in accordance with a judgment result of the judging step.

According to the invention, while a copyright-infringing copying and recording operation on a recording medium on which information having a copyright is recorded is prohibited, a copying and recording operation intended for personal use that does not infringe a copyright is allowed by accurately judging whether a copying and recording operation is of such a kind.

DETAILED DESCRIPTION OF THE PREFERRED EMBODIMENT

Figure 1:
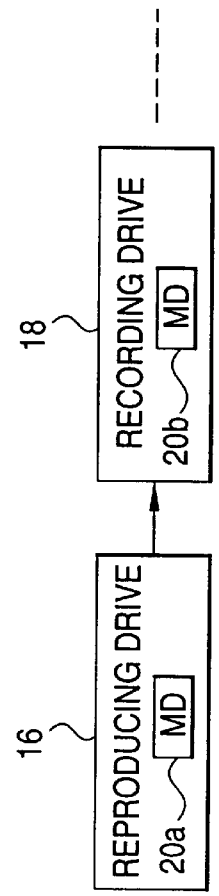
FIGS. 1(A) and 1(B) illustrate copying and recording of software having a copyright.
Figure 1:
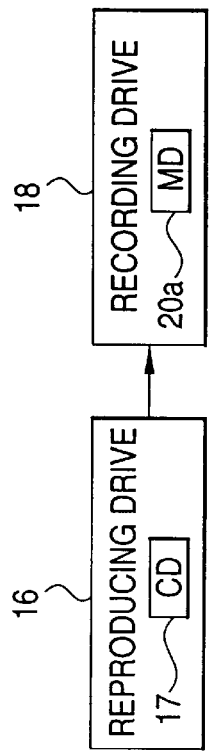
Figure 2:
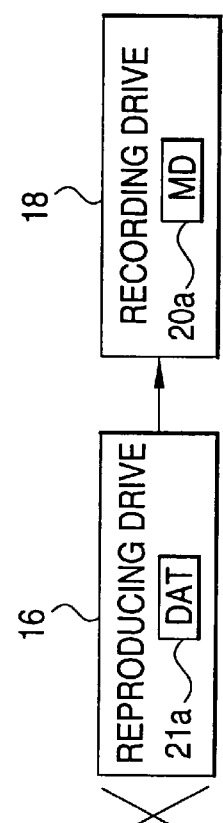
FIGS. 2(A) and 2(B) illustrate how copying and recording is limited by the SCMS.
Figure 2:
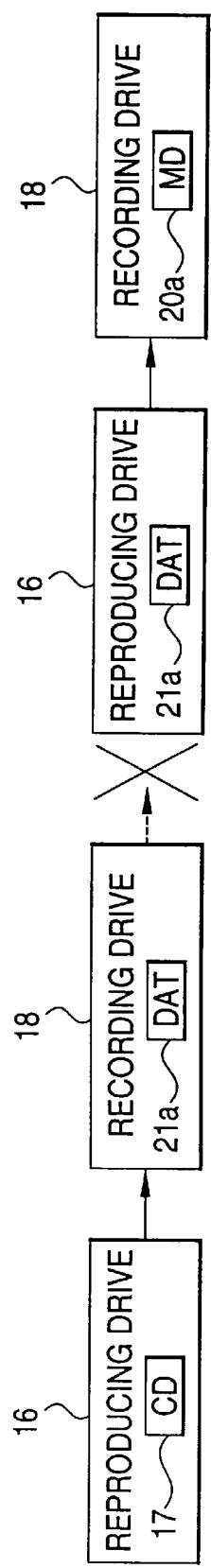
Figure 3:
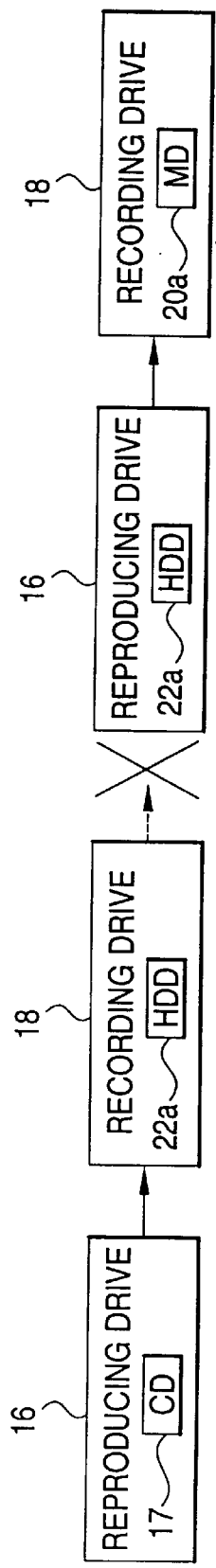
FIGS. 3(A) and 3(B) show another example illustrating how copying and recording is limited by the SCMS.
Figure 4:
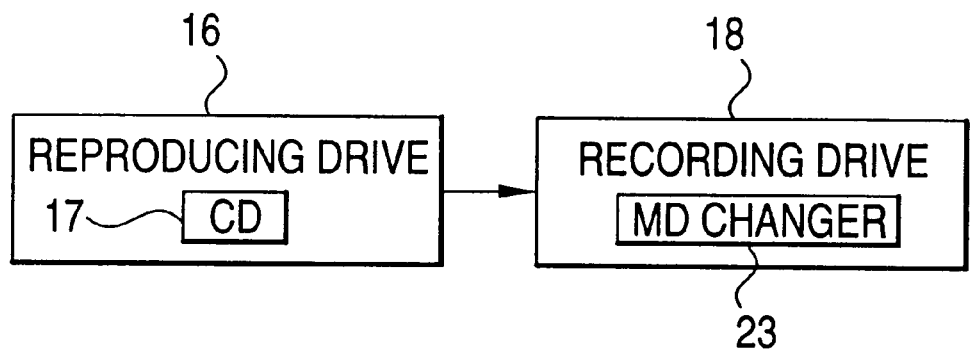
FIG. 4 illustrates a copying and recording operation using an MD changer.
Figure 5:
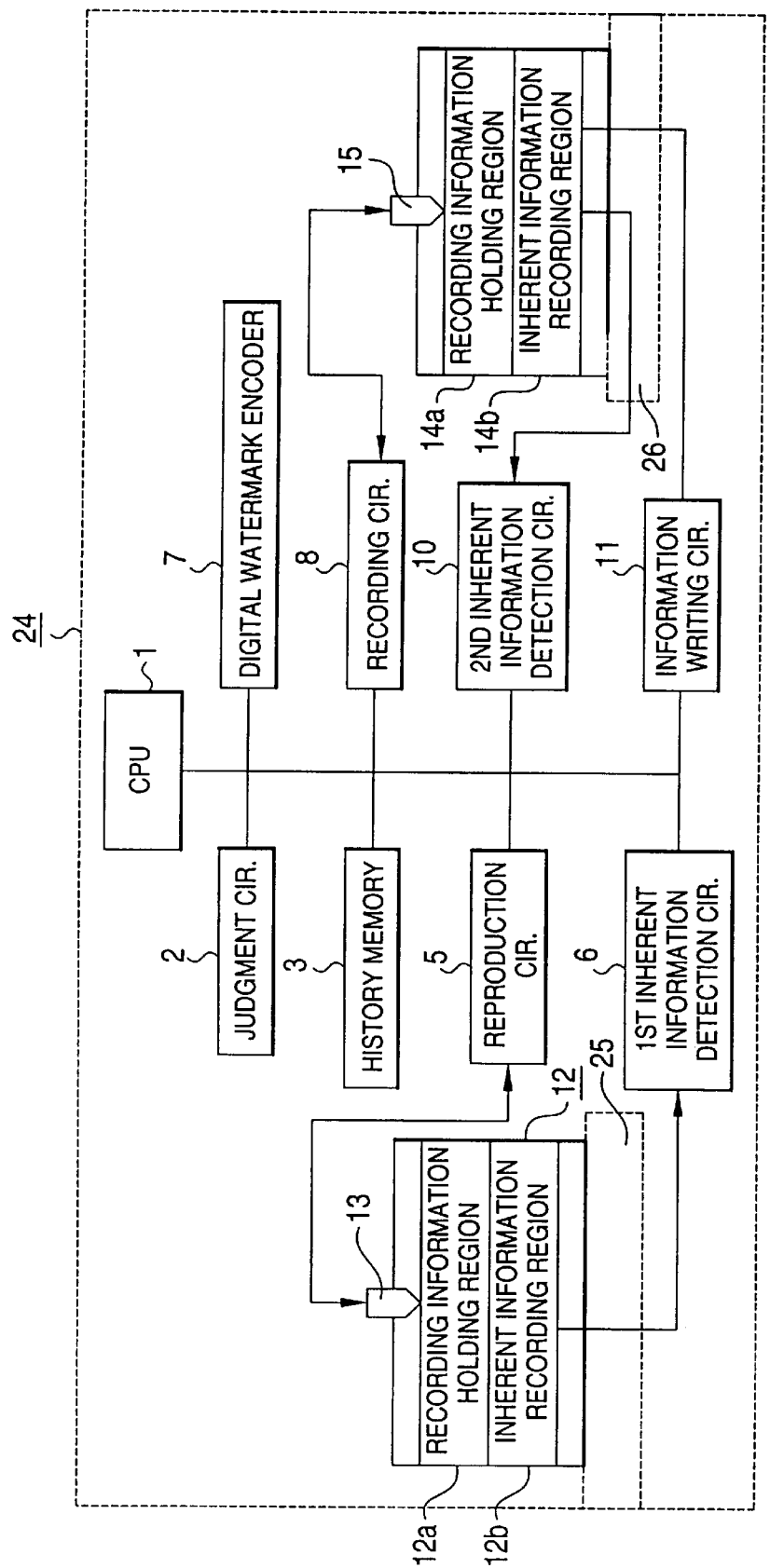
FIG. 5 is a block diagram showing the configuration of an information reproducing and recording apparatus according to an embodiment of the present invention.

An embodiment of the present invention will be hereinafter described with reference to FIG. 5. FIG. 5 is a block diagram showing the configuration of an information reproducing and recording apparatus according to the embodiment.

As shown in FIG. 5, an information reproducing and recording apparatus 24 according to the embodiment is equipped with a reproduction-side mounting section 25 in which a recording medium 12 such as a CD on which information of an author such as music or video information having a copyright is recorded is to be mounted, and a recording-side mounting section 26 in which a recording medium 14 such as an MD on which to record the above author information is to be mounted. The recording medium 12 has a recording information holding region 12a that holds the author information and inherent information recording region 12b in which original-indicative ID information of the author such as information according to the ISRC (international standard recording code) is recorded. The recording medium 14 has a recording information holding region 14a in which to record author information and an inherent information recording region 14b in which to record ID information indicating the kind of the recording medium 14.

The information reproducing and recording apparatus 24 is equipped with a CPU 1 that controls the entire operation. Connected to the CPU 1 via a bus B are a judgment circuit 2 that performs a judgment as to whether copying and recording should be permitted or not, a history memory 3 that stores copying and recording history information, a reproduction circuit 5 that controls a reproducing operation on the recording medium 12, and a first inherent information detection circuit 6 that reads out the ID information of the recording medium 12. The reproduction circuit 5 is also connected to a reproduction head 13 that reproduces information recorded in the recording information holding region 12a of the recording medium 12. The first inherent information detection circuit 6 is also connected to the inherent information recording region 12b of the recording medium 12.

Also connected to the CPU 1 via the bus B are a digital watermark encoder 7 that encodes a digital watermark, a recording circuit 8 that controls recording, onto the recording medium 14, of the author information that is reproduced from the recording medium 12, a second inherent information detection circuit 10 that reads out the ID information of the recording medium 14, an information writing circuit 11 that writes digital watermark data and collation code data to the recording medium 14. The recording circuit 8 is also connected to a recording head 15 that performs recording onto the recording information holding region 14a of the recording medium 14. The second inherent information detection circuit 10 and the information writing circuit 11 are also connected to the inherent information recording region 14b of the recording medium 14.

The operation of the above-configured information reproducing and recording apparatus 24 will be described below.

For example, assume a case that a CD on which music information having a copyright is recorded is mounted as the recording medium 12 in the reproduction-side mounting section 25 and the music information recorded on the recording medium 12 is copied and recorded. An MD, for example, as the recording medium 14 is mounted in the recording-side mounting section 26 and a reproducing and recording operation is started.

First, according to an instruction from the CPU 1, author ID information according to the ISRC indicating the original that is held in the inherent information recording region 12b of the recording medium 12 is read out therefrom by the first inherent information detection circuit 6. Then, according to an instruction from the CPU 1, ID information indicating the kind of the recording medium 14 is read out from the inherent information recording region 14b of the recording medium 14 by the second inherent information detection circuit 10. Then, according to an instruction from the CPU 1, history data of past copying and recording operations on the music information that is held by the recording medium 12 is retrieved from the history memory 3 based on the ID information of the recording medium 12.

After the retrieval of the history data, the judgment circuit 2 judges according to an instruction from the CPU 1 whether in the past the music information having a copyright that is held by the recording medium 12 was copied to and recorded onto a recording medium of the same kind as the recording medium 14, that is, an MD.

If it is judged that the music information held by the recording medium 12 was copied to and recorded onto an MD in the past, the operation of the recording circuit 8 is prohibited according to an instruction from the CPU 1, whereby the recording operation on the recording medium 14 is not performed.

On the other hand, if the judgment circuit 2 judges that the music information held by the recording medium 12 has not been copied to and recorded onto an MD yet, the music information is reproduced from the recording information holding region 12a of the recording medium 12 by the reproduction head 13 under the control of the reproduction circuit 5 that operates according to an instruction from the CPU 1. Further, the music information as reproduced from the recording medium 12 is recorded onto the recording information holding region 14a of the recording medium 14 by the recording head 15 under the control of the recording circuit 8 that operates according to an instruction from the CPU 1.

After the music information held by the recording medium 12 has been copied to and recorded onto the recording medium 14, the CPU 1 writes information to the effect that copying and recording were performed on a recording medium indicated by the ID information of the recording medium 14 to the history memory 3 so that the information is correlated with the ID information indicating the music information of the recording medium 12.

Once the information to the effect that copying and recording were performed on a recording medium of the same kind as the recording medium 14 is written to the history memory 3, the music information having a copyright that is held by the recording medium 12 can no longer be copied to and recorded onto another MD though the music information that has been copied to and recorded on the recording medium 14 can be used personally.

The copyright of the music information held by the recording medium 12 can thus be protected.

When the music information held by the recording medium 12 has been copied to and recorded onto the recording medium 14, according to an instruction from the CPU 1 the digital watermark encoder 7 generates digital watermark data by encoding the ID information indicating the music information that is held by the recording medium 12, the ID information indicating the kind of the recording medium 14, recording date and time information, and a collation code. Then, according to an instruction from the CPU 1, the information writing circuit 11 writes the digital watermark data as generated by the digital watermark encoder 7 to the recording information holding region 14a of the recording medium 14. Further, according to an instruction from the CPU 1, the information writing circuit 11 writes the collation code data to the inherent information recording region 14a of the recording medium 14 separately from the digital watermark data.

Therefore, if someone attempts to mount the recording medium 14 on which the music information having a copyright is recorded in the reproduction-side mounting section 25 and copy and record the music information onto a recording medium mounted in the recording-side mounting section 26, the first inherent information detection circuit 6 reads out the ID information indicating the music information having a copyright that is held by the recording medium 14 and the second inherent information detection circuit 10 reads out the ID information indicating the kind of the recording medium mounted in the recording-side mounting section 26. Based on the information stored in the history memory 3, the judgment circuit 2 judges whether the music information concerned was copied to and recorded onto a recording medium of the same kind as the recording medium 14 in the past.

Therefore, the CPU 1 prohibits the operation of mounting the recording medium 14 in the reproduction-side mounting section 25 and copying and recording the music information of the recording medium 14 onto the MD mounted in the recording-side mounting section 26. The copying and recording operation that infringes the copyright of the music information is thus prohibited.

In this example, copying and recording of the music information recorded on the recording medium 14 onto a recording medium other than an MD, such as a HDD, is permitted because this is an act to edit and use the music information personally and hence the CPU 1 judges that this act does not infringe the copyright.

When it is attempted to analog-recording, without using a digital interface, the music information having a copyright that has been copied to and recorded onto the recording medium 14, the recording is prohibited by detecting the digital watermark.

As described above, in the embodiment, the following operations are performed according to instructions from the CPU 1. The ID information of music information having a copyright that is recorded on a recording medium mounted in the reproduction-side mounting section 25 is detected by the first inherent information detection circuit 6. The ID information indicating the kind of a recording medium that is mounted in the recording-side mounting section 26 is detected by the second inherent information detection circuit 10. Based on information retrieved from the history memory 3, the judgment circuit 2 judges whether in the past the music information was copied to and recorded onto a recording medium of the same kind as the recording medium mounted in the recording-side mounting section 26. If a judgment result is affirmative, the CPU 1 prohibits the operation of copying and recording the music information recorded on the recording medium that is mounted in the reproduction-side mounting section 25 onto the recording medium mounted in the recording-side mounting section 26.

If the judgment circuit 2 judges that the music information recorded on the recording medium that is mounted in the reproduction-side mounting section 25 has not yet been copied to and recorded onto a recording medium of the same kind as the recording medium mounted in the recording-side mounting section 26, the operation of copying and recording the music information recorded on the recording medium that is mounted in the reproduction-side mounting section 25 onto the recording medium mounted in the recording-side mounting section 26 is performed with the CPU's judgment that this copying and recording operation is intended for personal use of the music information having a copyright.

As described above, in the information reproducing and recording apparatus according to the embodiment, a copying and recording operation on music information having a copyright is judged within the range of personal use unless it is directed to a recording medium of the same kind as a recording medium to which the music information has already been copied and recorded. And the copying and recording operation is performed without unduly limiting the range of personal use. Further, in the information reproducing and recording apparatus according to the embodiment, an operation of copying and recording music information having a copyright onto a recording medium of the same kind as a recording medium to which the music information has already been copied and recorded is prohibited strictly not only in a case where the operation is performed via a digital interface but also in a case of analog recording. Alteration of data that has been copied to and recorded onto a recording medium can be detected by comparing collation code data obtained from digital watermark data and collation code data recorded separately from the digital watermark data. The copyright of music information can thus be protected accurately.

In addition, the copying and recording speed may be switched in such a manner that the conventional digital interface (IEC 958) may be employed for one-fold-speed copying and recording and the scheme of the embodiment is employed for two-fold-speed copying and recording. The balance with the conventional scheme can be taken so as to be accepted by copyright owners and users by employing the two schemes depending on the copying and recording speed in the above manner.

What is claimed is:

1. An information recording apparatus for copying copyrighted information recorded on a first recording medium onto a second recording medium, comprising:

first detecting means for detecting first ID information identifying the copyrighted information that is recorded on the first recording medium;

second detecting means for detecting a type of the second recording medium;

history information storing means for storing the first ID information and second ID information identifying the type of the second recording medium so as to correlate those with each other;

history information retrieving means for retrieving the history information on the basis of the first ID information detected by the first detecting means and the type of the second recording medium detected by the second detecting means;

judging means for judging whether to permit or prohibit copying the copyrighted information recorded on the first recording medium onto the second recording medium in accordance with the history information retrieved by the retrieving means; and copying means for copying the copyrighted information recorded on the first recording medium onto the second recording medium in accordance with a judgment result of the judging means.

2. The information recording apparatus according to claim 1, wherein the judging means judges that the copying of the copyrighted information should be permitted if the number of times the copyrighted information identified by first ID information detected by the first detecting means have been copied onto a recording medium which is the same type of recording medium detected by the second detecting means is smaller than a predetermined number.

3. The information recording apparatus according to claim 2, wherein the predetermined number is one.

4. The information recording apparatus according to claim 1, wherein a speed of the copying and recording operation controlled by the copying means is two or more times an ordinary recording speed.

5. The information recording apparatus according to claim 1, further comprising:

digital watermark forming means for forming a digital watermark by encoding the first ID information, the second ID information, and a collation code; and information writing means for writing the digital watermark and the collation code to the second recording medium.

6. The information recording apparatus according to claim 1, wherein the first ID information is data in an ISRC format.

7. An information recording method for copying copyrighted information recorded on a first recording medium onto a second recording medium, comprising:

a first detecting step of detecting first ID information identifying the copyrighted information that is recorded on the first recording medium;

a second detecting step of detecting a type of the second recording medium;

a history information storing step of storing the first ID information and second ID information identifying the type of the second recording medium so as to correlate those with each other;

a history information retrieving step of retrieving the history information on the basis of the first ID information detected by the first detecting step and the type of the second recording medium detected by the second detecting step;

a judging step of judging whether to permit or prohibit copying the copyrighted information recorded on the first recording medium onto the second recording medium in accordance with the history information retrieved by the retrieving step; and a copying step of copying the copyrighted information recorded on the first recording medium onto the second recording medium in accordance with a judgment result of the judging step.

8. The information recording method according to claim 7, wherein the judging step judges that the copying of the copyrighted information should be permitted if the number of times the copyrighted information identified by first ID information detected by the first detecting step have been copied onto a recording medium which is the same type of recording medium detected by the second detecting step is smaller than a predetermined number.

9. The information recording method according to claim 8, wherein the predetermined number is one.

10. The information recording method according to claim 7, wherein a speed of the copying and recording operation controlled in the copying step is two or more times an ordinary recording speed.

11. The information recording method according to claim 7, further comprising:

a digital watermark forming step of forming a digital watermark by encoding the first ID information, the second ID information, and a collation code; and an information writing step of writing the digital watermark and the collation code to the second recording medium.

12. The information recording method according to claim 7, wherein the first ID information is data in an ISRC format.

* * * * *